United States Patent
Natarajan

(10) Patent No.: US 9,540,518 B2
(45) Date of Patent: Jan. 10, 2017

(54) APPARATUS AND PROCESS FOR AIRHEATER WITHOUT QUENCH IN CARBON BLACK PRODUCTION

(71) Applicant: Cuddalore Padmanaban Natarajan, Wexford, PA (US)

(72) Inventor: Cuddalore Padmanaban Natarajan, Wexford, PA (US)

(73) Assignee: ANASUYA NATARAJAN, Wexford, PA (US)

( * ) Notice: Subject to any disclaimer, the term of this patent is extended or adjusted under 35 U.S.C. 154(b) by 300 days.

(21) Appl. No.: 14/214,721

(22) Filed: Mar. 15, 2014

(65) Prior Publication Data
US 2015/0258515 A1 Sep. 17, 2015

(51) Int. Cl.
| | |
|---|---|
| C10B 39/00 | (2006.01) |
| C09C 1/48 | (2006.01) |
| F28D 7/16 | (2006.01) |
| F28F 9/18 | (2006.01) |
| F28F 9/22 | (2006.01) |
| F28F 21/04 | (2006.01) |
| F28F 21/08 | (2006.01) |
| F28F 9/02 | (2006.01) |
| F28F 9/10 | (2006.01) |
| C09C 1/50 | (2006.01) |
| F28D 21/00 | (2006.01) |

(52) U.S. Cl.
CPC . *C09C 1/48* (2013.01); *F28D 7/16* (2013.01); *F28D 21/0001* (2013.01); *F28F 9/0229* (2013.01); *F28F 9/10* (2013.01); *F28F 9/185* (2013.01); *F28F 9/187* (2013.01); *F28F 9/22* (2013.01); *F28F 21/04* (2013.01); *F28F 21/08* (2013.01); *C09C 1/50* (2013.01); *F28D 2021/0022* (2013.01); *F28F 2230/00* (2013.01); *F28F 2265/10* (2013.01); *F28F 2265/26* (2013.01); *F28F 2275/06* (2013.01)

(58) Field of Classification Search
CPC .............. C09C 1/48; C09C 1/487; C09C 1/50; F28F 9/007; C10B 39/04
USPC . 165/164, 165, 172, 177; 126/109; 422/150, 422/151, 201; 202/96
See application file for complete search history.

(56) References Cited

U.S. PATENT DOCUMENTS

| | | | | |
|---|---|---|---|---|
| 3,580,237 A | * | 5/1971 | Barsby | F24H 3/006 126/110 R |
| 5,205,276 A | * | 4/1993 | Aronov | F24H 3/087 126/106 |

(Continued)

*Primary Examiner* — Nina Bhat

(57) ABSTRACT

In the production of carbon black by the furnace process, fuel and heated combustion air or oxygen enriched air from the combustion air heat exchanger, are fired into the reactor, resulting in a hot flame. Carbonaceous feed stock, injected into this hot flame containing considerable excess oxygen, is pyrolized. The effluent from the reactor reaction zone is quickly cooled, typically by water quench, to prevent secondary reactions that decrease the quality and yield of carbon black. In the present invention, water quench is eliminated and the effluent from the reaction zone passes directly into the metallic combustion airheater, quickly cooling it to stop pyrolysis and heating the combustion air to typically 950 C. The combustion air heater is smaller due to high heat flux per unit volume. Further cooling of the effluent to the carbon black collector, is achieved by series of heat exchangers and trimming water quench.

4 Claims, 9 Drawing Sheets

(Dimensions are typical)

(56) References Cited

U.S. PATENT DOCUMENTS

| | | | | |
|---|---|---|---|---|
| 5,477,846 A | * | 12/1995 | Cameron | F24H 3/087 |
| | | | | 126/109 |
| 6,086,841 A | * | 7/2000 | Lee | C09C 1/50 |
| | | | | 423/449.1 |
| 2009/0107660 A1 | * | 4/2009 | Eriksson | C09C 1/48 |
| | | | | 165/159 |
| 2013/0039841 A1 | * | 2/2013 | Nester | B01J 19/26 |
| | | | | 423/450 |

* cited by examiner (Dimensions are typical)

Bellows type seal joint 31
(Tube expands upward relative to top tube sheet)

APPARATUS AND PROCESS FOR AIRHEATER WITHOUT QUENCH IN CARBON BLACK PRODUCTION

BACKGROUND OF THE INVENTION:

Field of the Invention:

The invention relates to a metallic combustion air heater, herein referred to as NQAPH (No Quench Air Pre Heater), located immediately after the reaction zone of a carbon black reactor and subject to high temperature of the reactor effluent, around 1300 C (2372 F). The invention, (NQAPH), eliminates the water quench, serves as the apparatus to stop the pyrolysis and cools the effluent sufficiently to protect downstream equipment including the carbon black collector; the invention has higher heat transfer rates and results in a smaller combustion air heater compared to the prior art (APH). Quench water to stop the pyrolysis is eliminated, saving associated energy loss. (162 kg/h of quench water and 123 kW of energy per 1000 nm3/h of combustion air for a typical 950 C combustion air heater)

Description of the Prior Art

In the prior art, carbon black by furnace process is made by creating a high temperature flame (around 1925 C) in an adiabatic reactor, firing fuel into a stream of hot combustion air from a combustion air preheater; injecting Carbonaceous feedstock into the flame and make carbon black and other gases by pyrolysis. The Carbon black containing gases compose of CO, H2, CO2, CH4, C2H2, N2, H2O and traces of H2S, COS and is known as the reactor effluent. When the right quality of Carbon black is made, the pyrolysis should be stopped by quickly cooling the effluent immediately after the reaction zone. In the prior art mostly water has been used to quench the reactor effluent to arrest pyrolysis and to cool the effluent further to protect the downstream equipment, typically combustion air heater, (APH). Such water has to be treated to reduce the impurities content for carbon black product quality as well as trouble free operation of downstream equipment (due to the deposition of the impurities on the heating surfaces). This water, an increasingly important commodity, is converted to superheated vapor in this cooling process and the water and energy are irrecoverably lost to the atmosphere.

Besides, the with poor atomization of the water, tiny droplets of water may entrain the carbon black and deposit them on the inside of the tubes of the combustion air preheater and cause fouling of the tubes and reduce the heat transfer effectiveness of the air heater and other downstream heat exchangers.

The effluent, inadequately cooled due to the fouling, will increase in temperature entering the bag collector, and will require more water quench to protect the carbon black collector.

To eliminate the water quench in carbon black manufacture by furnace process, borrowing from the Ethylene production process, quench boilers have been used to stop the pyrolysis and cool the effluent to safe operating temperature for the combustion air preheater. These quench boilers use high pressure water as the cooling medium and generate high pressure steam which may be used in the process or generate electrical power.

In U.S. Pat. No. 465,270, Mills et al use water quench only to stop the pyrolysis and further cooling till the next heat exchanger is done by pumping required amount of cooled effluent from upstream of the carbon black collector.

Per U.S. Pat. No. 6,086,841, Lee has proposed to eliminate the water quench and stop the pyrolysis and cool the reactor effluent by means of a heat exchanger lined with silicon carbide. The effluent exiting the lined heat exchanger enters the combustion air heater, followed by secondary cooler and carbon black collector. The heat from the lined heat exchanger is lost to the atmosphere or transferred to another fluid stream.

The prior art combustion air heater, (APH), typically a shell and tube counter current unit, has the hot reactor effluent from the reaction zone, cooled adequately with water quench to stop the pyrolysis and reduce the effluent temperature safe for the combustion air heater (APH), flowing inside multiple vertical tubes at high velocities, typically around 80 m/s. Such high effluent velocities and vertical orientation of tubes are needed to keep the carbon black in suspension and minimize the fouling on the tube walls which will hinder good heat transfer. The tubes are housed inside an enclosure bounded by a metallic shell and tube sheets at the hot and cold ends of the APH.

The combustion air, facilitated by baffles inside the shell, flows over the tubes in multiple passes; the air flows partly in cross flow, transvers to the tubes and partly in longitudinal flow parallel to the tubes.

Higher combustion air temperatures result in lower fuel consumption to the combustion section of the reactor, increased O2 availability in the flame, higher yield and increased production rate of carbon black. To obtain these benefits of economy in carbon black manufacture, the combustion air temperature for the furnace process gradually increased from 450 C in the 1970's to 650 C & 800 C through the 90's to the current 950 C. Improved higher temperature materials may, in the future, push the combustion air temperature to 1000 C and beyond. These increases have been achieved in the prior art APH, by higher effluent inlet temperatures to the combustion air preheater by reduced quench.

Present Invention:

In the present invention, the metallic combustion air heater, NQAPH, is located immediately after the reaction zone, eliminating the water quench. The effluent containing carbon black, at high temperature (typically around 1300 C +) enters the inside of the vertical tubes at high velocity (typically 80 m/s). Combustion air flows over the tubes in multiple passes, facilitated by segmented, disc and donut type baffles.

In the present invention, the water quench in the prior art to stop pyrolysis and control the hot air temperature of the combustion air heater, is eliminated. The NQAPH replaces the lined heat exchanger per Lee which dissipates the heat to the atmosphere or other fluid, before flowing into the combustion air heater. The present invention operating with lower effluent flow due to the absence of the water quench and at high temperature results in a smaller combustion air heater than in the prior art for the same combustion air temperature (950 C).

In the present invention, the absence of water quench reduces the volume of effluent from the reaction zone by about 10.5%. This reduced effluent flow at 1300 C and the 950 C combustion air temperature results, by heat balance, in effluent exiting the combustion air heater at 865 C.

An all co current air heater (with the effluent and combustion air flowing co currently) is not feasible as the air temperature 950 C. is higher than effluent exit temperature of 865 C.

An all counter current air heater is feasible, with the combustion air at 950 C exiting the air heater at the point where the hot effluent at 1300 C is entering. However, this will subject the metallic tube to a maximum temperature, about 1135 C, exceeding the usable limit of commercial metals. Additionally, the top and bottom plates of the double plate bottom tube sheet will be hotter than the top tube sheet, resulting in the tube holes of the top and bottom tube sheets not being aligned and failure of the seals between the tube and the top tube sheet.

To obviate these problems, the present invention is a combination co current counter current combustion air preheater, wherein the hottest tube is not at the hottest entry of the effluent, but at a location between the top and bottom tube sheets, where the effluent has cooled sufficiently. Such splitting of the cooling medium into two streams, with one stream co current and the other counter current, to keep the hottest metal temperature away from the hottest entry temperature of the heating medium has been used extensively by those skilled in the art, as shown by Cox (U.S. Pat. No. 2,869,830), by Schack ((U.S. Pat. No. 2,917,285) and by Cameron (U.S. Pat. No. 5,477,846).

In the present invention, the total combustion air is split into three streams in the heat exchanger. As shown in FIG. 1, the stream 1, approximately 50% of the total air flow will enter the shell of the air heater (NQAPH) at the hot end, near the double plate bottom tube sheet and flow over the tubes in multiple passes co-current to the reactor effluent. The second stream, approximately 35 to 40% of the total air flow will enter the shell of the air heater (NQAPH) at the colder end, near the top tube sheet, and flow over the tubes in multiple passes counter-current to the reactor effluent. The third stream, approximately 15% to 10% of the total air flow will flow through the double plate bottom tube sheet (to cool the tube sheet plates) and flow out of the top plate of the double plate bottom tube sheet, through the inside of one or more cooling air return pipes and join the second stream of air at the colder end of the air heater (NQAPH). This third stream picks up heat from the effluent carrying tubes, connected to the double plate bottom tube sheet as well as the heat radiated by the adjacent hot effluent carrying tubes to the cooling air return pipe(s).

When this warm stream 3, mixes with stream 2 of air, the combined stream is warmer than the entering second stream and helps reduce the fouling tendency, by keeping the effluent carrying tubes near the top tube sheet, warmer. The co-current and counter current air streams pick up heat from the hot tubes inside which the hot reactor effluent is flowing and join together about the middle and exit the air heater (NQAPH). At this location, the effluent has been cooled to a temperature of about 1085 C and the tube materials are at about 1025 C, well within the usable limits of metals. The hot process air flows through the external hot air piping to the reactor.

In the present invention, the heat transfer flux increases by about 34%, the length of the tubes is reduced by about 25%, making the process air heater 25% shorter and making the usually vertically oriented air heater, structurally more stable.

In the present invention, unlike the prior art (APH) where the hot exiting air is in contact with the top plate of the double plate bottom tube sheet, cold incoming air of streams 1 and 3 are in direct contact with the double plate bottom tube sheet, keeping the tube sheet plates cooler and therefore, stronger.

In the present invention, the tube to bottom tube sheet weld, (FIG. 2), being in contact with the cold incoming air of stream 3, is, therefore, stronger and minimizes the potential for cracking and failure. The stream 3 flow is controllable by a control valve, based on the measured tube sheet plate temperature and the measured temperature of stream 3 exiting the double bottom tube sheet.

In the present invention, the shell, due to full length internal and external insulation, operates at lower temperature than in the prior art (APH) where only part of the shell is internally and externally insulated. (FIG. 6 shows the shell and tube temperatures for the NQAPH and prior art APH)

In the present invention, due to the shorter length of the unit, as in (006) above, and lower temperature, as in (009) above, the shell thermally expands less than the shell in the prior art (APH). The differential expansion between the tube and shell is also lower than in the prior art (APH). (FIG. 7 shows the thermal expansions of the tube, shell and the differential between them for the NQAPH and prior art APH)

In one configuration, the shell of this airheater (NQAPH) is fully externally and internally insulated. The internal insulation is retained in place by means of metal pins and metallic liner. The process air flows over this metallic liner.

In another configuration, the shell is only externally insulated and is provided with an internal metallic liner. The second stream of air will enter the airheater at the hot end and flows to the colder end through the annulus between the shell and the inner metallic liner. Typically, turbulators are provided in the annulus to improve heat transfer and structural stability of the inner liner which is subject to the pressure of the combustion air on the outside of the inner liner.

In one configuration, the internal baffles to create multiple passes for the airheater (NQAPH) are of the segmented type.

In another configuration, the internal baffles to create multiple passes for the airheater (NQAPH) arc of the disc and donut type or any other method to create multiple passes of the process air.

In one configuration, the tubes are connected to the top tube sheet at the colder end of the airheater (NQAPH) by means of packing seals (FIG. 3), with the tubes free to slide inside the seals.

In another configuration, the tubes are connected to the top tube sheet at the colder end of the airheater (NQAPH) by means of metallic bellow type seals (FIGS. 4 and 5), welded to the sleeves in the top tube sheet or by any other method of sealing the process air from mixing with the hot reactor effluent, allowing for the hot tubes to thermally expand freely.

The process air for the CB production may be ambient air, Oxygen enriched air or 100% Oxygen.

DESCRIPTION

Figure 1:
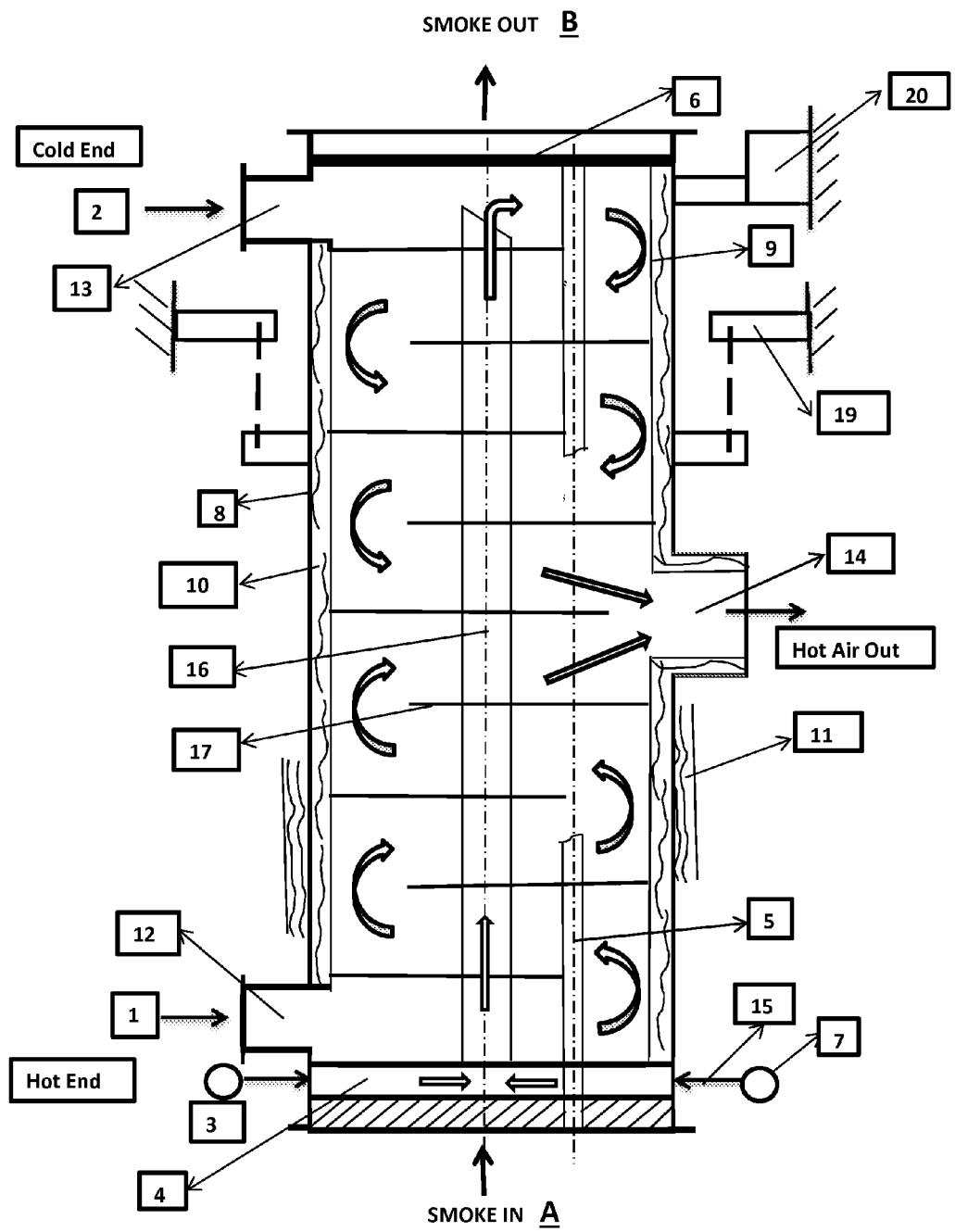
FIG. 1 shows the General arrangement of the present invention, indicating the flow of the carbon black effluent from the reaction zone and the 3 streams of the combustion air through the combustion air heater, NOAPH
Figure 1A:
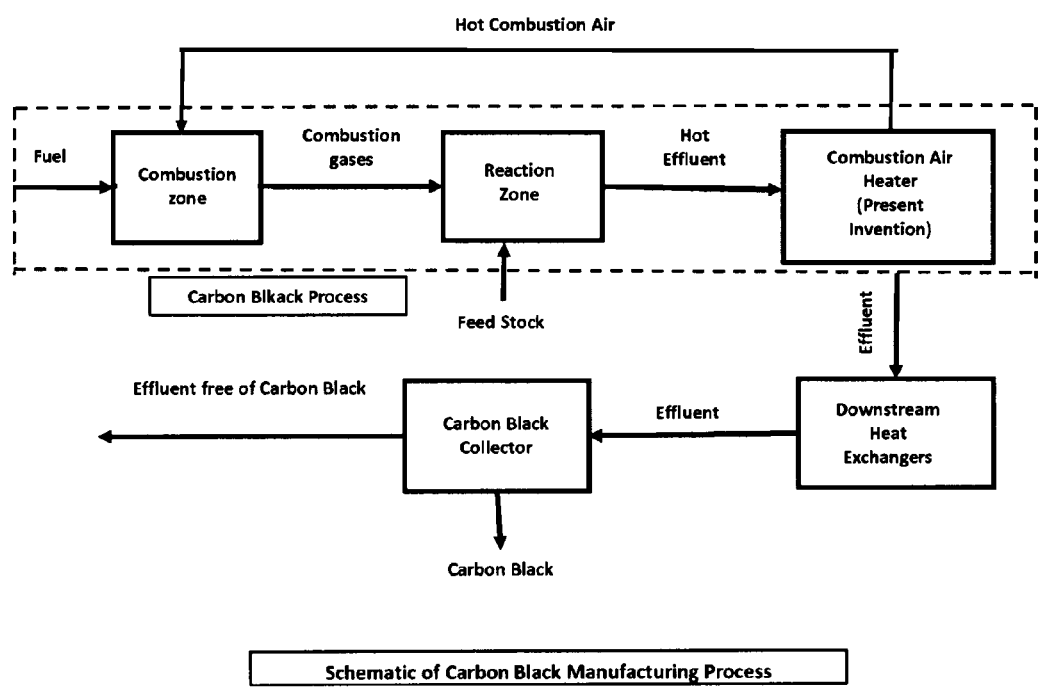
FIG. 1A shows schematic of Carbon Black Manufacturing Process.

The invention is depicted in FIG. 1:

A is the entry of the Carbon black furnace effluent into the apparatus.

B is the exit of the effluent after being cooled in the apparatus

1 is the first stream of process air, entering at the hot end of the air heater through nozzle 12.

2 is the second stream of process air, entering at the colder end of the air heater through nozzle 13.

3 is the third stream of process air, entering from the cooling air header 7 into the double plate bottom tube sheet, 4, entering through cooling air nozzles 15. The bottom plate of this tube sheet

4 is refractory lined to protect this plate from the high temperature of the reactor effluent.

5 are the multiple tubes of the airheater inside which the hot reactor effluent flows at high velocity. These tubes are connected to the bottom tube sheet 4 and the top tube sheet 6. This top tube sheet 6 is generally refractory lined

8 is the metallic shell of the airheater, fitted with internal insulation 10, retained by metallic pins and metallic plate 9. External insulation on the shell is shown as 11.

14 is the nozzle through which the heated process air stream leaves the airheater.

16 is the return pipe for the cooling air from the top plate of the bottom tube sheet 4 to the colder section of the airheater. This can be a single large pipe or multiple smaller pipes.

17 are the set of baffles inside the airheater which makes the process air to flow in multiple passes over the outside of the tubes 5. These baffles may of the segmented type (shown) or the disc and donut type.

Constant load hangers 19 or counter weights are provided to keep the shell always in tension and prevent shell buckling under adverse operating conditions.

Sway brackets 20 are provided on the shell of the airheater to minimize the lateral movement of the airheater due to wind loads, uneven heating of the tubes 5, uneven cooling of shell due to changing wind direction.

Figure 2:
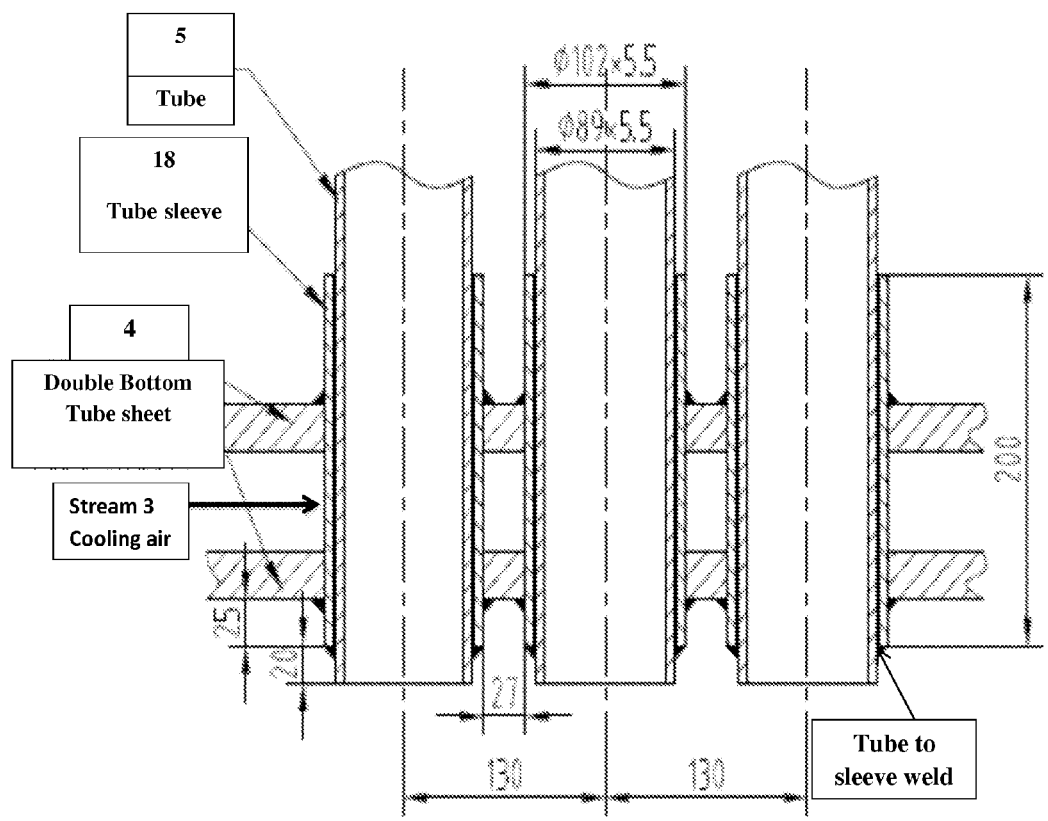
FIG. 2 depicts the cooled double bottom tube sheet of the invention, showing the flow of the air stream 3, tube sleeves and their attachment to the tube sheet plates and attachment of the tubes to the tube sleeves.

FIG. 2 shows the tubes 5 welded to sleeves 18 which is welded to the bottom tube sheet 4 and shows the tube to sleeve weld.

The tubes 5 may be connected to the top tube sheet 6 with packing seals 21 (FIG. 3), bellows type seals 22 (FIGS. 4 & 5) or any other suitable method of sealing the process air from mixing with the hot combustible reactor effluent.

Figure 3:
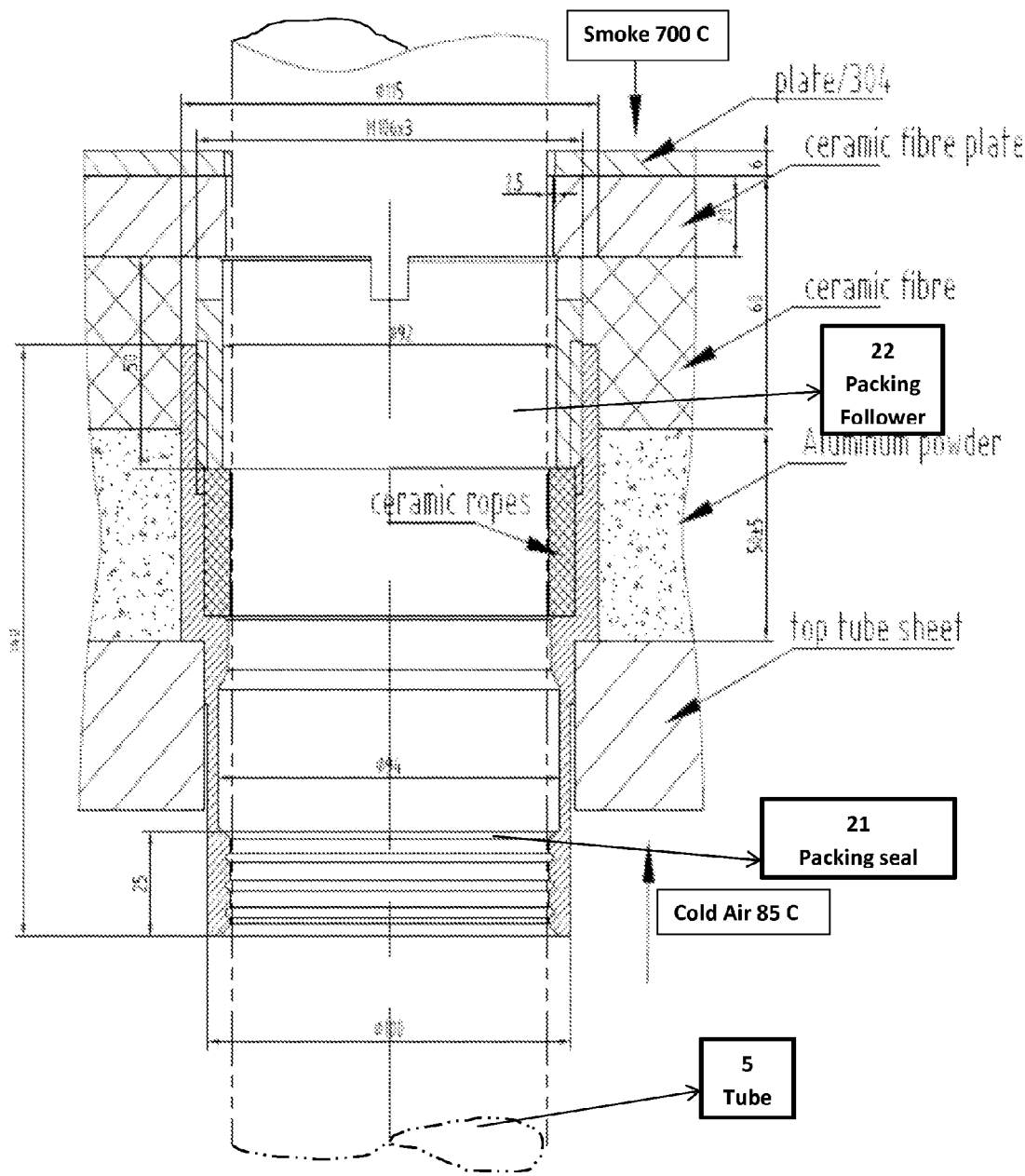
FIG. 3 depicts the sliding type seal between the tube and the top tube sheet

FIG. 3 shows the packing seal type of joint. The packing seal 21 is provided with grooves and ceramic packing to let the tube freely expand inside the packing seal, at the same time making a difficult path for the air inside the shell to leak into the hot smoke. The tube end is machined to close tolerance with a very small clearance between the tube and the seal. When the hotter tube expands in diameter more than the colder seal, the clearance becomes smaller and the air to smoke seal tighter. A threaded follower 22 keeps the ceramic packing tight as a secondary sealing.

Figure 4:
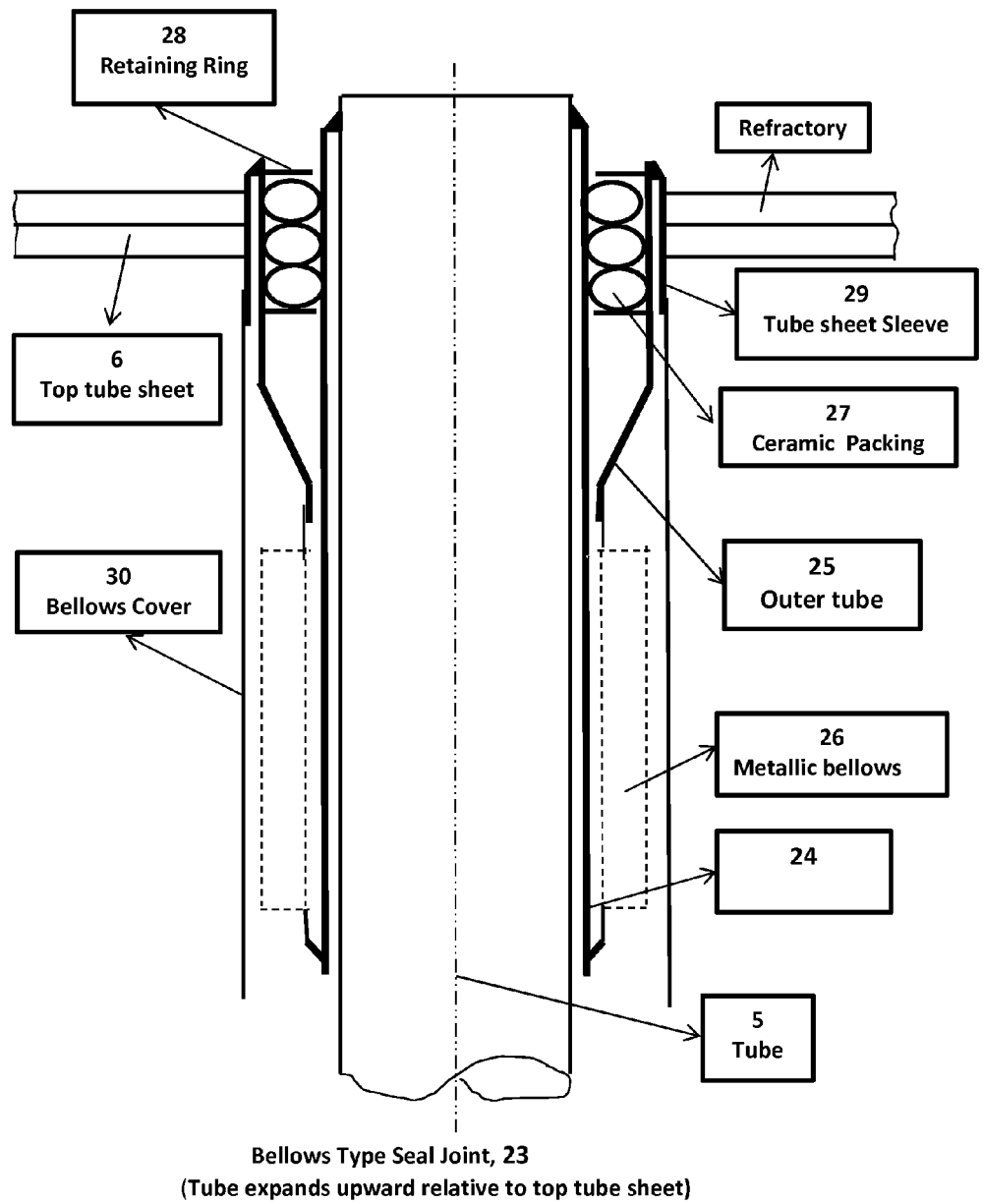
FIG. 4 depicts the bellows type of seal between the tube and the top tube sheet, bellows in compression during service

FIG. 4 shows a replaceable bellows type seal joint 23, with bellows in compression during service. This seal has an inner tube 24 (welded to the tube 5), outer specially shaped tube 25, multi convolution metallic bellows 26, connected by welding to 24 and 25. Ceramic packing made out of ceramic rope 27 is placed tightly between 24 and 25 to minimize the ingress of carbon black in the smoke getting to the inside of the bellows. Such ingress over a period of time will pack the bellows with hardened carbon black and make the bellows ineffective, as the bellows squeeze together during service. The ceramic rope is kept in place by the retainer ring 28. The entire joint is connected to the top tube sheet 6 by welding to the tube sheet sleeve 29. The thin walled bellows are protected from the turbulence of the flowing process air by the bellows cover 30.

Figure 5:
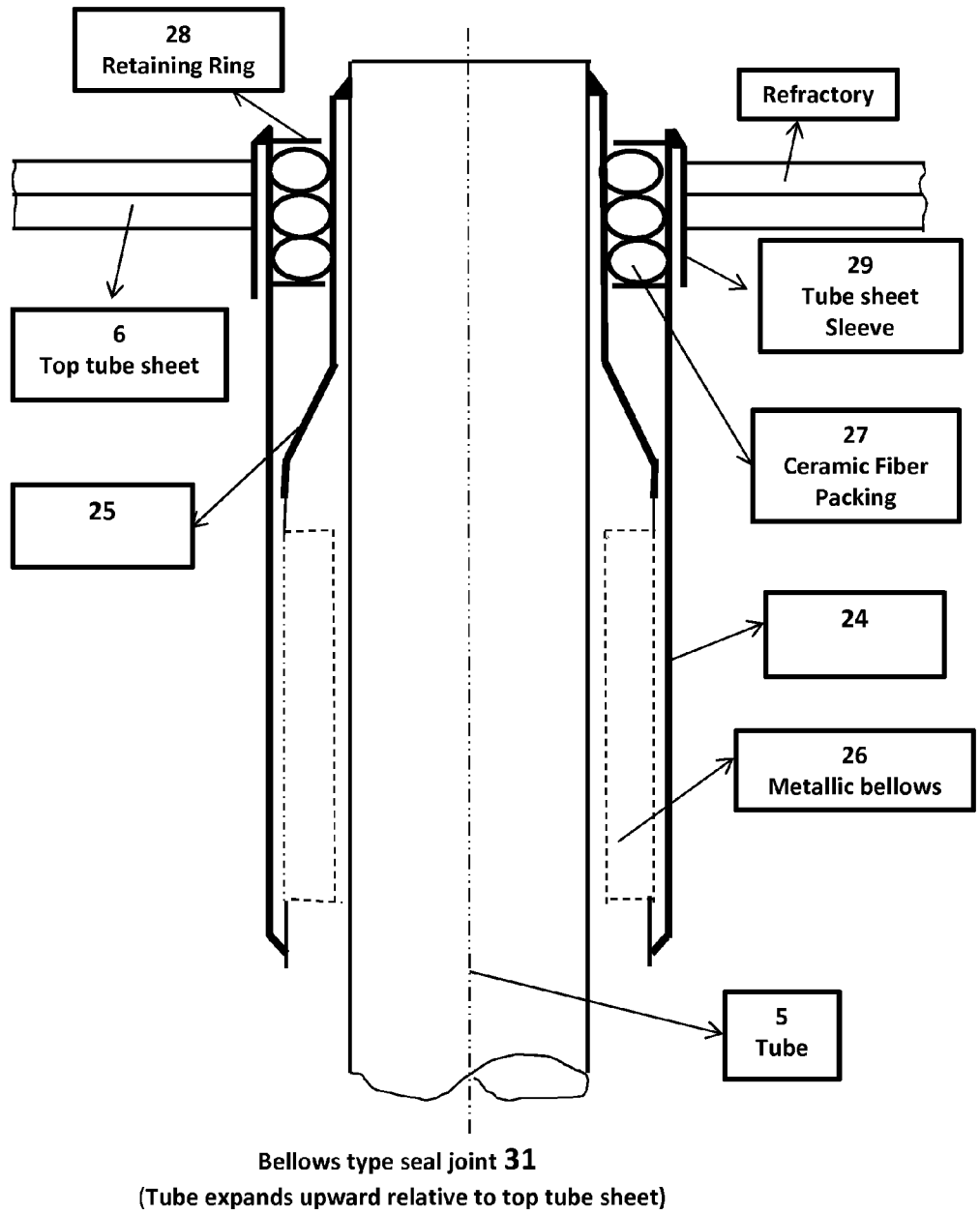
FIG. 5 depicts the bellows type of seal between the tube and the top tube sheet, bellows in tension during service

FIG. 5 also shows a replaceable bellows type seal joint 31, but it is designed for the bellows to be in tension in service. This type of joint is less sensitive to carbon black packing inside the bellows. When in service, the bellows stretch and the joint is still effective. This seal has an outer tube 24 (welded to the tube 5), inner specially shaped tube 25, multi convolution metallic bellows 26, connected by welding to 24 and 25. Ceramic packing made out of ceramic rope 27 is placed tightly between 24 and 25 to minimize the ingress of carbon black in the smoke getting to the inside of the bellows. The ceramic rope is kept in place by the retainer ring 28. The entire joint is connected to the top tube sheet 6 by welding to the tube sheet sleeve 29. No separate bellows cover is needed as the outer tube 24 protects the thin walled bellows from the turbulence of the flowing process air.

Figure 6:
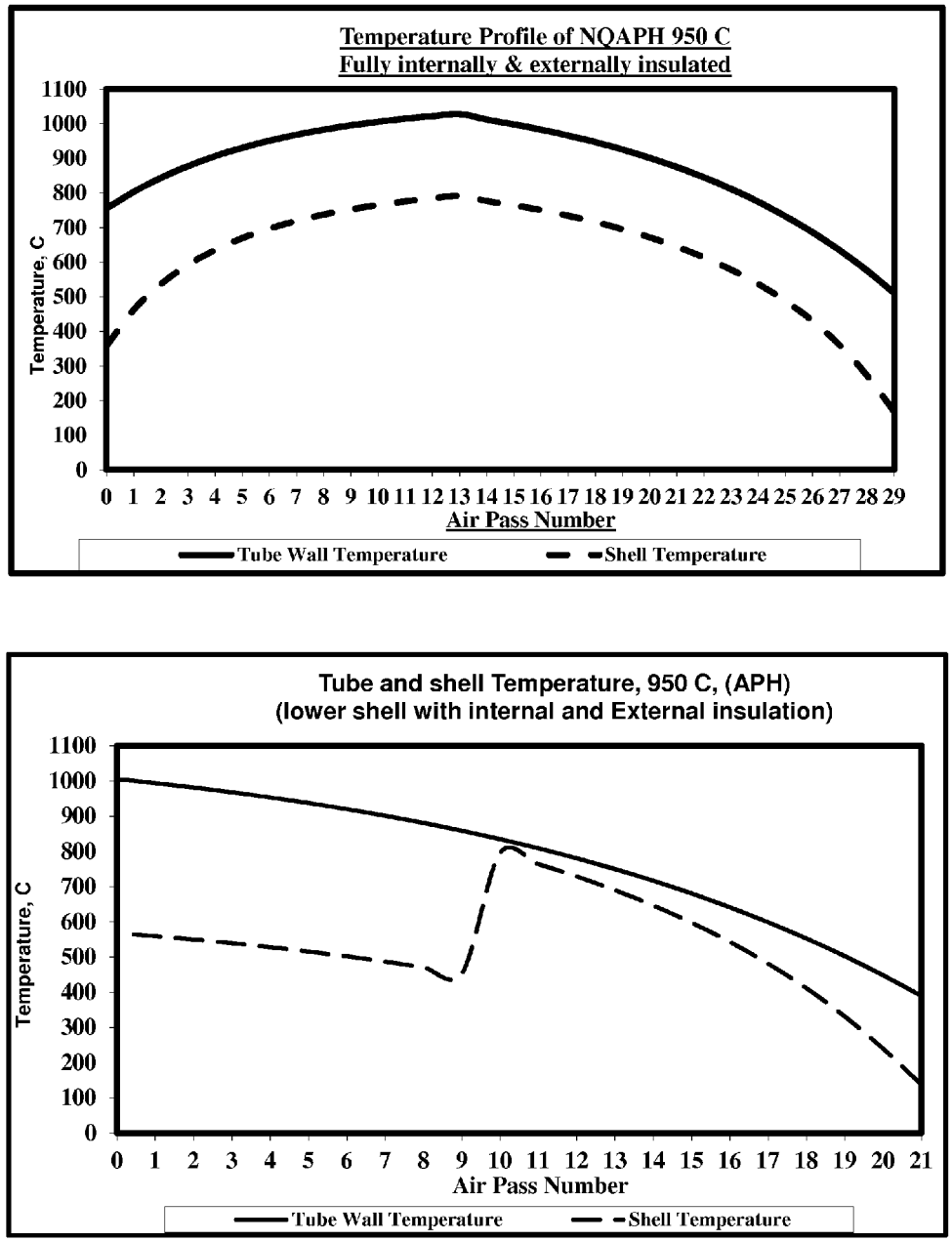
FIG. 6 depicts the temperature profile for the tube and shell of the present invention, also showing temperature profiles for the prior art

FIG. 6 shows the tube and shell metal temperature profile of the invention, NQAPH and the prior art combustion airheater APH. It should be noted that the maximum tube wall and shell temperatures occur near the air outlet near the middle of the airheater (NQAPH). At the smoke entry and exit points of the present invention, (NQAPH), where the tubes are connected to the bottom and top tube sheets respectively, the temperatures are lower, making the joints stronger and less susceptible to failure.

Figure 7:
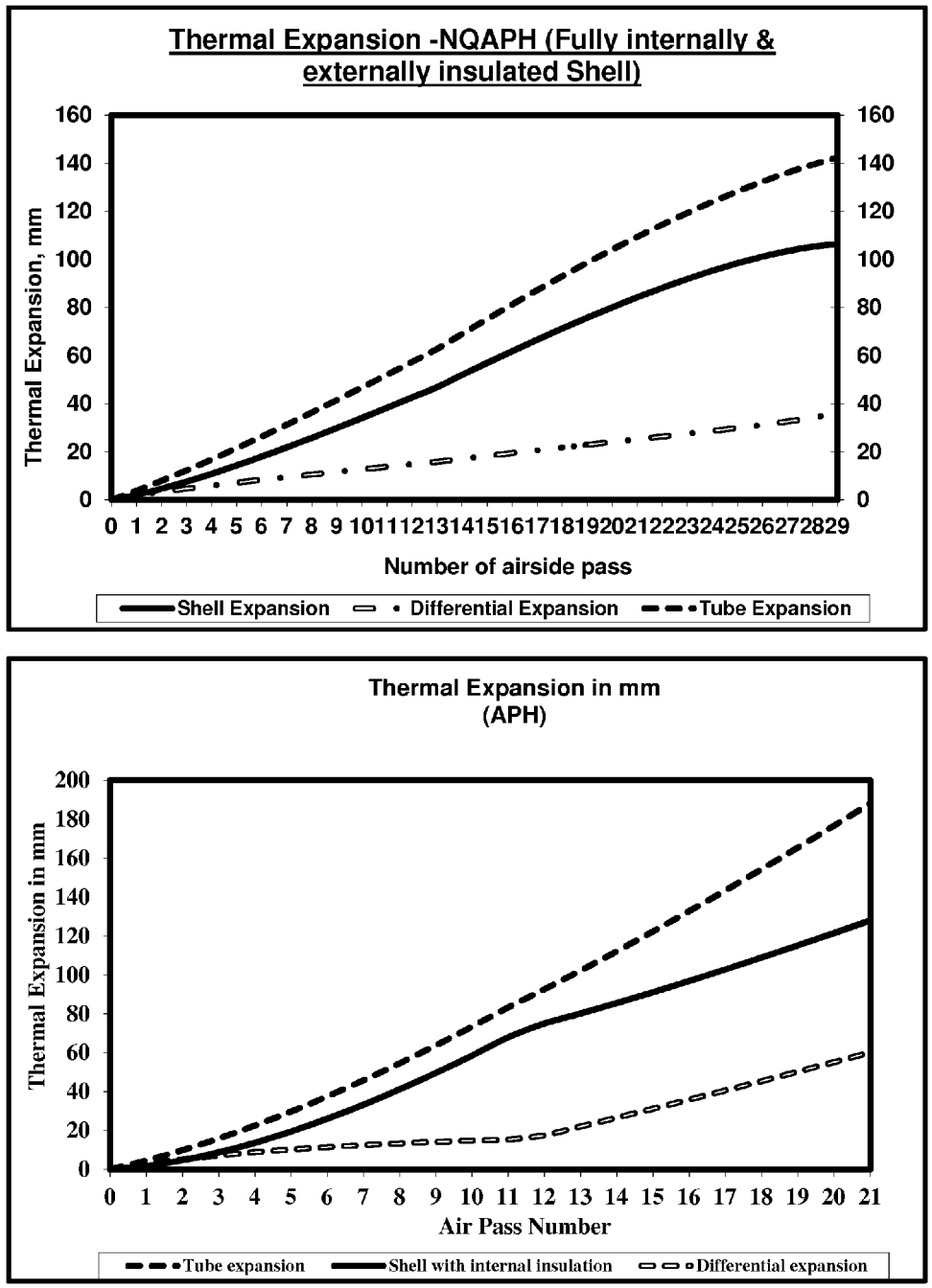
FIG. 7 depicts the thermal expansion profile of the tube and shell of the present invention, also showing the thermal expansion profile for the prior art.

FIG. 7 shows the thermal expansion of the tubes, the shell and the differential thermal expansion between the tube and shell for the NQAPH and prior art combustion airheater APH. It should be noted that the thermal expansions are smaller for the present invention than the prior art airheater. The differential expansion between the tube and shell is also smaller for the present invention, resulting in smaller number of convolutions for the bellows type seal depicted in FIGS. 4 and 5. The lower thermal expansions are due to the shorter length of the tubes in the present invention (NQAPH) as shown in Table 1.

Figure 8:
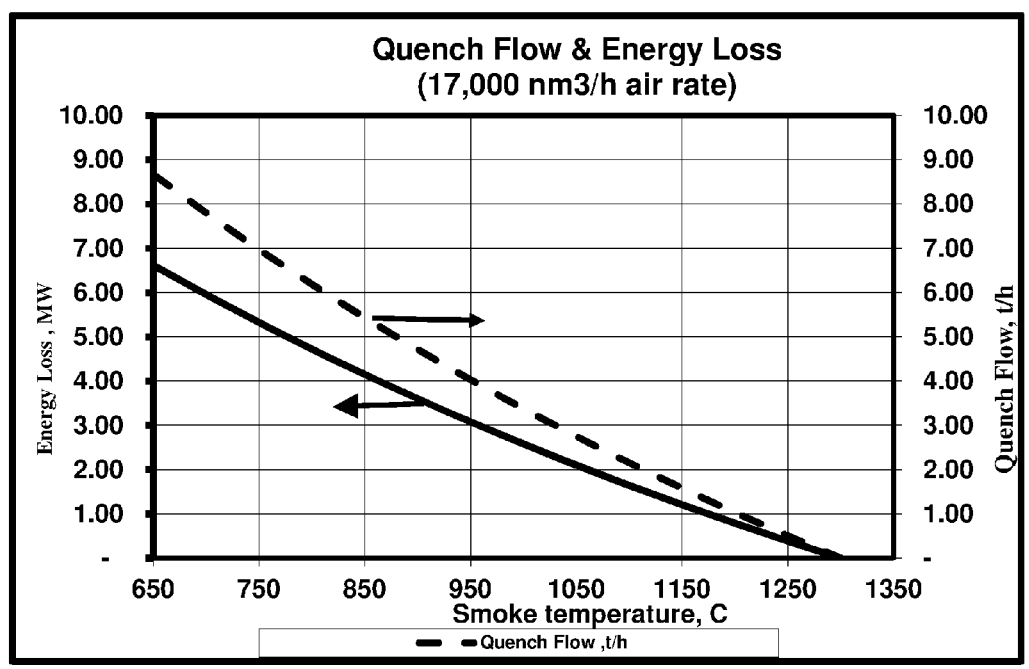
FIG. 8 (New) depicts the quench water flow and irrecoverable energy loss due to quench water

FIG. 8 (New) shows the quench water flow and irrecoverable energy loss associated when quench water is used to stop pyrolysis and also cool the effluent safe enough for downstream equipment. The present invention, NQAPH eliminates water quench and saves water and energy.

EXAMPLE

In a carbon black furnace, 17,000 nm3/h of hot air at 920 C is admitted along with adequate fuel (oil or natural gas) into the reactor to raise the flame to a temperature around 1925 C. Hot carbonaceous feed stock is sprayed into this Oxygen rich hot flame and the ensuing pyrolysis converts the feed stock to carbon black and other gases. This reactor effluent of 29,130 nm3/h at around 1300 C, enters the present invention combustion air heater, NQAPH, which stops the pyrolysis and also preheats the combustion air to 950 C. In the prior art APH, with counter current flow of effluent and combustion air, 1300 C+ effluent temperature is too high and the effluent is cooled down to 1050 C by water spray of 2,750 kg/h, before entering the APH. The volume of gases entering the APH is 32,550 nm3/h. This water (2,750 kg/h) is not recovered and will be lost into the atmosphere. This additional water also causes problems in the downstream equipment like the bag filter with wetness.

In the present invention of combustion airheater (NQAPH), all of this water is saved. A single airheater (NQAPH) will stop the pyrolysis and cool the gases from 1,300 C to 865 C, while heating the combustion air to 950 C. Further heat recovery from the CB containing reactor effluent down to the safe temperature for the Carbon Black collector can be achieved with additional heat exchangers for heating feed stock and fuel, high and low pressure steam generation, tail gas preheating etc.

Table 1 compares the airheater (NQAPH) and the prior art airheater (APH), both of them designed to preheat the process air to 950 C.

TABLE 1

|  |  | NQAPH | APH |
|---|---|---|---|
| Process Data: |  |  |  |
| Heating side: |  |  |  |
| Medium |  | CB gases | CB gases |
| Volume of gases | nm$^3$/h | 29,130 | 32,550 |
| Temperature of gases entering | C. | 1,300 | 1,050 |
| Temperature of gases leaving | C. | 865 | 640 |
| Heat Transferred | MM Kcal/h | 5.126 | 5.126 |
| Entering velocity inside tubes | m/s | 90.7 | 79.7 |
| Exiting velocity inside tubes | m/s | 65.6 | 54.5 |
| Additional Quench water | kg/h | 0 | 2,750 |
| Cooling side: |  |  |  |
| Medium |  | Process Air | Process Air |
| Flow volume | nm3/h | 17,000 | 17,000 |
| DBTS Cooling air flow | nm3/h | 1,700 | 1,700 |
| Entering temperature | C. | 60 | 60 |
| Exiting temperature | C. | 950 | 950 |
| Heat Exchanger Data: |  |  |  |
| Number of tubes | — | 108 | 108 |
| Tube spacing | mm | 130 | 130 |
| Length of each tube | m | 9.33 | 12.5 |
| Total Number of baffles | — | 28 | 16 |
| Heat flux_Co-current section | kcal/m2 h | 22,291 | — |
| Heat flux_Counter-current section | kcal/m2 h | 15,390 | 13,600 |
| Overall Heat Flux | kcal/m2 h | 18,223 | 13,600 |
| Total Heating Surface | m2 | 281.3 | 376.9 |
| Tube thermal Expansion | mm | 142 | 188 |
| Shell thermal expansion | mm | 106 | 128 |
| Differential thermal Expansion | mm | 36 | 60 |
| Effluent residence time | sec | 0.120 | 0.186 |

I claim:

1. A carbon black process system comprising a fuel combustion zone, carbon black reactor and an improved combustion air heater constructed and arranged to stop pyrolysis within the carbon black reactor by indirect heat transfer by said combustion air heater; wherein fuel is burned in said combustion zone to produce hot combustion gases, said combustion gases is reacted with a carbon feedstock to produce a hot effluent stream which flows through said improved combustion heater consisting of a double plate tube sheet at said combustion air heater hot effluent entry, a single plate tube sheet at said combustion air heater cooled effluent exit; further comprising a plurality of metallic tubes in operative connection to the said tube sheets and a metallic shell enclosing the said tube sheets and tubes forming the shell space for the flow of said combustion air; wherein said hot effluent from said reactor enters said combustion air heater through the inside of said plurality of tubes connected to said double plate tube sheet and exiting said combustion air heater apparatus through tubes connected to said single plate tube sheet in operative connection with downstream effluent cooling equipment; said combustion air heater stream flows in multiple passes over the outside of the tubes in the shell space of said apparatus transferring the heat from said hot reactor effluent to said combustion air and wherein individual replaceable tube seals are located at the top tube sheet allowing thermal expansion of the hot tubes and preventing hot combustible reactor effluent stream mixing with the said combustion air.

2. In the combustion air heater apparatus as claimed in claim 1, the combustion air is divided into three streams; a first stream comprising of 50% of the total combustion air; a second stream comprising of 35% to 40% of the total combustion air and a third stream comprising the balance of the total combustion air.

3. In the combustion air heater apparatus as claimed in claim 1, the said first combustion air stream enters the shell space near the said double plate tube sheet and flows over the outside of the said plurality of tubes in multiple passes co currently to the hot effluent which is flowing inside the said plurality of tubes; wherein the said second stream of combustion air enters the said shell space near the said single plate tube sheet and flows over the said plurality of tubes in multiple passes, counter currently to the hot effluent flowing inside the said plurality of tubes; segmented, disc and donut or similar baffles located in the said shell space of the said combustion air heater apparatus facilitate theses multiple passes for the combustion air streams.

4. In the combustion air heater apparatus as claimed in claim 1, the third combustion air stream enters the space between the plates of the said double plate tube sheet by means of multiple nozzles, thereby cooling the two plates of the said double plate tube sheet from the heat of the said plurality of tubes in which the hot effluent is flowing and from the radiation heat of the carbon black reactor; after cooling the said double plate tube sheet, the said third stream of combustion air will exit the top plate of the said double plate tube sheet and flow towards the said single plate tube sheet through one or more tubes, co currently to the hot effluent flowing inside said plurality of tubes; this third stream will then join the said second stream of air and flow over the outside of the plurality of tubes co currently to the hot effluent flowing inside said plurality of tubes; the said combustion air stream 1 and said combustion air streams 2 and 3, after absorbing the heat from the hot effluent flowing inside the said plurality of tubes, exit the said combustion air heater apparatus near the middle of the shell.

* * * * *